(12) United States Patent
Choi

(10) Patent No.: US 8,868,629 B2
(45) Date of Patent: Oct. 21, 2014

(54) APPARATUS AND METHOD FOR COMMUNICATING PARAMETER OF INVERTER

(75) Inventor: Young Seob Choi, Cheonan (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/046,540

(22) Filed: Mar. 11, 2011

(65) Prior Publication Data

US 2011/0231456 A1 Sep. 22, 2011

(30) Foreign Application Priority Data

Mar. 17, 2010 (KR) .................. 10-2010-0023799

(51) Int. Cl.
 *G06F 7/00* (2006.01)
 *G06F 17/00* (2006.01)
 *G06F 17/30* (2006.01)
 *G05B 19/042* (2006.01)

(52) U.S. Cl.
 CPC .. *G05B 19/0423* (2013.01); *G05B 2219/23391* (2013.01)
 USPC .............................. 707/899; 713/1

(58) Field of Classification Search
 CPC .................. G06F 17/30377; G06F 17/30424
 USPC ........... 709/231; 380/288; 713/153; 718/106; 715/254; 707/607, 769, 756
 See application file for complete search history.

(56) References Cited

U.S. PATENT DOCUMENTS

| | | | | |
|---|---|---|---|---|
| 5,291,391 A * | 3/1994 | Mead et al. | ..................... | 700/28 |
| 6,792,479 B2 * | 9/2004 | Allen et al. | ..................... | 710/10 |
| 7,007,015 B1 * | 2/2006 | Nayak | ..................... | 1/1 |
| 7,191,331 B2 * | 3/2007 | Maufer et al. | ................ | 713/153 |
| 7,616,594 B2 * | 11/2009 | Roberts et al. | ................ | 370/310 |
| 7,783,046 B1 * | 8/2010 | Sklyarov et al. | .............. | 380/286 |
| 7,792,858 B2 * | 9/2010 | Tang et al. | ..................... | 707/780 |
| 7,814,220 B2 * | 10/2010 | Rydenhag | ..................... | 709/231 |
| 8,352,719 B2 * | 1/2013 | Grube et al. | ..................... | 713/2 |
| 8,560,855 B2 * | 10/2013 | Resch | ..................... | 713/176 |
| 2008/0122656 A1 * | 5/2008 | Carani et al. | ............ | 340/995.28 |
| 2011/0202541 A1 * | 8/2011 | Permandla et al. | .......... | 707/742 |

FOREIGN PATENT DOCUMENTS

| | | |
|---|---|---|
| CN | 1367575 | 9/2002 |
| JP | 2002140113 | 5/2002 |
| JP | 2007-151217 | 6/2007 |

(Continued)

OTHER PUBLICATIONS

Korean Intellectual Property Office Application No. 10-2010-0023799, Office Action dated Jan. 24, 2014, 4 pages.

(Continued)

*Primary Examiner* — Susan Chen
(74) *Attorney, Agent, or Firm* — Lee, Hong, Degerman, Kang & Waimey

(57) ABSTRACT

Disclosed is an apparatus for communicating parameter of an inverter, the apparatus being connected to a plurality of inverters for communication, includes a communication unit for communicating with the inverter to transmit and receive parameter of the inverter; and a controller for storing parameter of the inverter in at least one of a storage address corresponding to an inherent identification number of the inverter, a user terminal and an external storage device according to an inputted command signal, or transferring parameter of the inverter to be transmitted, to the communication unit and then to at least one of the inverter, the user terminal and the external storage device.

10 Claims, 4 Drawing Sheets

(56) References Cited

FOREIGN PATENT DOCUMENTS

| | | |
|---|---|---|
| JP | 2007-228764 | 9/2007 |
| JP | 2008-154432 | 7/2008 |
| JP | 2009211245 | 9/2009 |
| JP | 2009276853 | 11/2009 |
| KR | 1020060009717 | 2/2006 |

OTHER PUBLICATIONS

The State Intellectual Property Office of the People's Republic of China Application Serial No. 201110068381.3, Office Action dated May 10, 2013, 7 pages.

Japan Patent Office Application Serial No. 2011-058330, Office Action dated Nov. 20, 2012, 2 pages.

* cited by examiner

APPARATUS AND METHOD FOR COMMUNICATING PARAMETER OF INVERTER

Pursuant to 35 U.S.C. §119 (a), this application claims the benefit of earlier filing date and right of priority to Korean Patent Application No. 10-2010-0023799, filed on Mar. 17, 2010, the contents of which are hereby incorporated by reference in their entirety.

BACKGROUND OF THE DISCLOSURE

1. Field of the Invention

The present disclosure relates to an apparatus for communicating parameter of an inverter and a method thereof, and more particularly, to an apparatus configured to transmit and/or receive parameters of a plurality of inverters by communicating with the plurality of inverters.

2. Description of the Related Art

Most of driving devices in modern industries are formed of motors, and inverters are necessarily used to precisely control the motor. Further, a PLC (Programmable Logic Controller) is currently used to manipulate a plurality of inverters.

In order to review a state of an inverter, the parameter stored in the inverter should be reviewed. To this end, a key pad that is a wired editor having a remote control function is used, which can control the inverter or other control devices.

In order to set parameter in a plurality of conventional inverters, a scheme is used in which the keypad is connected to any one of the inverters to be communicated therebetween whereby the parameter is stored in the inverter, the connection to the inverter is released, and the keypad is connected to another inverter having the same type (inverters with the same type but with different item numbers) so that the parameter is stored.

Further, when it is needed to make a backup of parameter of an inverter, a personal computer should be brought to a place where the inverter is installed.

However, since each inverter conventionally requires a keypad to be attached thereto in order to set parameter, there is a problem that a number of keypads is needed when the parameters are set in a number of converters, so that it costs much more money.

Further, there is another problem that when it is needed to make a backup of an inverter parameter, a personal computer should be brought to a place where the parameter is set in a number of inverters so that it is troublesome.

SUMMARY OF THE INVENTION

The present disclosure provides an apparatus for communicating parameter of an inverter, capable of reading and writing parameter stored in a plurality of inverters through a parameter communication apparatus, and converting the parameter into data of file format and being variously used in a user terminal or an external storage unit.

According to an aspect of the present disclosure, an apparatus for communicating parameter of an inverter, the apparatus being connected to a plurality of inverters for communication, includes a communication unit for communicating with the inverter to transmit and receive parameter of the inverter; and a controller for storing parameter of the inverter in at least one of a storage address corresponding to an inherent identification number of the inverter, a user terminal and an external storage device according to an inputted command signal, or transferring parameter of the inverter to be transmitted, to the communication unit and then to at least one of the inverter, the user terminal and the external storage device.

According to an embodiment of the present invention, the controller may convert parameter of the inverter into data of a file format and stores the data in at least one of a storage address corresponding to an inherent identification number of the inverter, a user terminal and an external storage device, when the command signal is a read condition of parameter.

According to an embodiment of the present invention, the controller may transfer parameter of the inverter to be transmitted, to the communication unit and then to at least one of the inverter, the user terminal and the external storage device, when the command signal is a write condition of the parameter.

According to an embodiment of the present invention, the controller may include a converter to convert the parameter into data of a file format through an embedded file system.

According to an embodiment of the present invention, the apparatus may further include a storage unit that stores parameter of the inverter in a storage address corresponding to an inherent identification number of the inverter.

According to an embodiment of the present invention, the storage unit may include an internal storage unit and an external storage unit, the internal storage unit being a flash memory and the external storage unit being an external storage device.

According to an embodiment of the present invention, the communication unit may include a USB port communicating with a user terminal and a communication port communicating with an external storage device, the USB port and communication port receiving input power together with the parameter of the inverter.

According to an embodiment of the present invention, the apparatus may further include a display unit to display state information and operation information of the apparatus for communicating parameter of an inverter according to a display control signal input from the controller.

According to another aspect of the present disclosure, a method for communicating parameter of an inverter, the apparatus being connected to a plurality of inverters for communication, includes (a) determining the kind of input command signal; (b) detecting an inherent identification number of the inverter; and (c) storing parameter of the inverter in at least one of a storage address corresponding to the inherent identification number of the inverter detected in step (b), a user terminal and an external storage device, or transferring parameter of the inverter to be transmitted, to at least one of the inverter, the user terminal and the external storage device according to a determination result of step (a).

According to an embodiment of the present disclosure, step (c) may include converting parameter of the inverter into data of a file format and storing the data in at least one of a storage address corresponding to an inherent identification number of the inverter, a user terminal and an external storage device, when the command signal is a read condition of the parameter.

According to an embodiment of the present disclosure, step (c) may include transferring parameter of the inverter to be transmitted, to at least one of the inverter, the user terminal and the external storage device, when the command signal is a write condition of the parameter.

According to an embodiment of the present disclosure, step (c) may include (f) reading parameter of the inverter; (g) converting the parameter read in step (f) into data of file format; and (h) storing the data converted in step (g) in at least one of a storage address corresponding to the inherent identification number of the inverter, the user terminal and the external storage device.

According to an embodiment of the present disclosure, step (c) may include (k) detecting a storage address corresponding to an inherent identification number of the inverter; and (l) transmitting the parameter stored in the storage address that is detected in step (k) to at least one of the inverter, the user terminal and the external storage device.

According to an apparatus for communicating parameter of the inverter according to an embodiment of the present disclosure, there are effects as follows.

First, it is possible to read and write parameter stored in a plurality of inverters with ease through one apparatus for communicating parameter of an inverter. As such, users can set the parameter with ease so that it may be helpful for maintenance.

Second, there is a merit that the parameter can be converted into data of a file format and used in a user terminal or an external storage device with ease, and the apparatus has an excellent compatibility with Windows and has no memory limitation.

Third, since the parameter converted into data of file format can be stored in a flash memory, the apparatus for communicating parameter of an inverter functions as a mobile storage device, and data can be easily transferred.

Fourth, since an inverter power supply is used when connected to an inverter and a USB power supply of the terminal is sued when connected to a user terminal, through a dual power supply, an additional power supply is not needed and therefore a mobile freedom can be increased.

Fifth, since it is possible to set a plurality of inverters in a group unit, it is possible to store and manage several groups of parameter and therefore setting the inverter that has the same function and different group unit can be set conveniently and with ease.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE PREFERRED EMBODIMENTS

Figure 1:
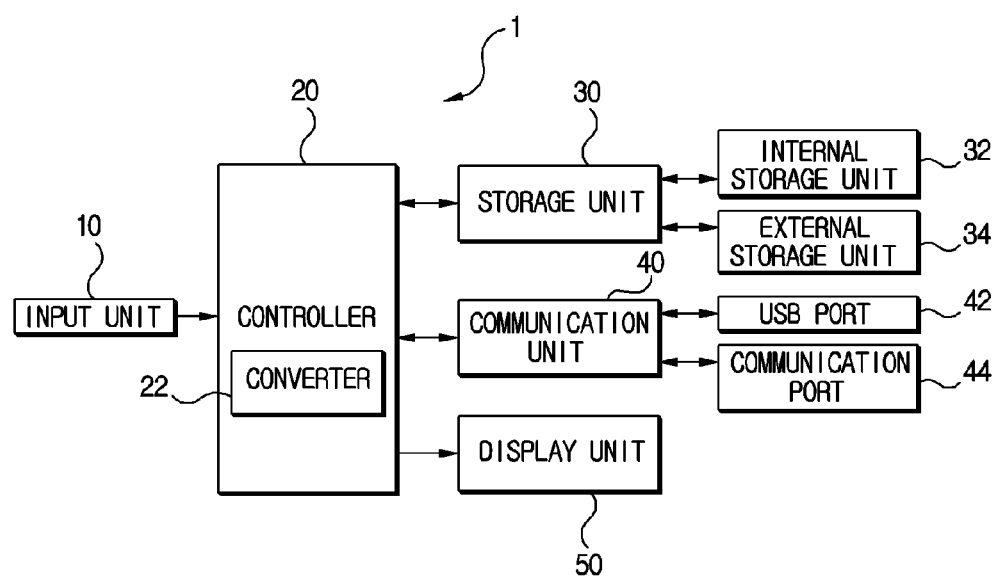
FIG. 1 is a block diagram illustrating an apparatus for communicating parameter of an inverter according to an embodiment of the present disclosure.

Hereinafter, embodiments of the present disclosure will be described with reference to the accompanying drawings. In this procedure, size and shape of the components shown in the drawings may be exaggerated for the sake of clarity and convenience. Further, terms that are specifically defined in consideration of construction and operation of the present disclosure may be changed according to operator's intention or custom. Definition of such items should be made on the basis of entire contents of the specification.

FIG. 1 is a block diagram illustrating an apparatus for communicating parameter of an inverter according to an embodiment of the present disclosure.

As illustrated in FIG. 1, an apparatus 1 for communicating parameter of an inverter includes an input unit 10, a controller 20, a storage unit 30, a communication unit 40 and a display unit 50.

The input unit 10 is a means to which state and operation information depending on a kind of the apparatus 1 of communicating parameter of an inverter are inputted, that is, to which a command signal to set, identify or edit parameter of an inverter is selectively inputted.

To describe in more detail, a read command signal corresponding to a read condition to read parameter of an inverter and a write command signal corresponding to a write condition to write parameter in an inverter can be selectively inputted to the input unit 10, using a plurality of setting buttons arranged in the apparatus 1 for communicating parameter of an inverter.

The controller 20 is a microcomputer that generally controls the apparatus 1 for communicating parameter of an inverter, which includes a converter 22. When an inverter is connected to the apparatus 1 for communicating parameter of an inverter, the controller 20 determines the kind of condition among the plurality of setting conditions.

That is, the controller 20 receives command signal applied from the input unit 10 and determines which command signal between a read command signal corresponding to a read condition or a write command signal corresponding to a write condition has been selected and inputted among the plurality of setting conditions.

Further, the controller 20 analyzes inverter information stored in an inverter and detects an inherent ID (identification) number corresponding to the inverter.

That is, the controller 20 determines the kind of inverter among the plurality of inverters by analyzing the information stored in the inverter and detecting the inherent ID number corresponding to the inverter.

In order to control a plurality of inverters through one parameter communicating apparatus, the apparatus 1 for communicating parameter of an inverter according to an embodiment of the present disclosure can control parameter of a plurality of inverters with ease by giving an inherent ID number to an inverter and enabling the controller 20 to detect the inherent ID number.

Meanwhile, in the case of a read condition of parameter (that is, a read command signal is inputted from the input unit 10), the controller 20 reads the parameter stored in the inverter, and converts the parameter into data of a file format using the converter 22.

To describe in more detail, in the case of a read condition of parameter, the controller 20 receives the parameter stored in the inverter through the communication unit 40, and transmits the received parameter to the converter 22 so that the parameter can be converted into data of a file format. Here, the converter 22 converts the parameter into data of a file format using an embedded file system and stores or organizes it so that a user terminal such as a personal computer or external storage device can easily find the data and access to it.

Such a file system is generated on a data storage device that can make an access to an arrangement of same size blocks (also referred to as sector). The file system makes a file or directory by organizing such an arrangement and makes a mark on each arrangement to identify which sectors belong to file and which are not be used. Further, the file system address data in fixed-sized units called 'cluster' or 'block'.

Figure 2:
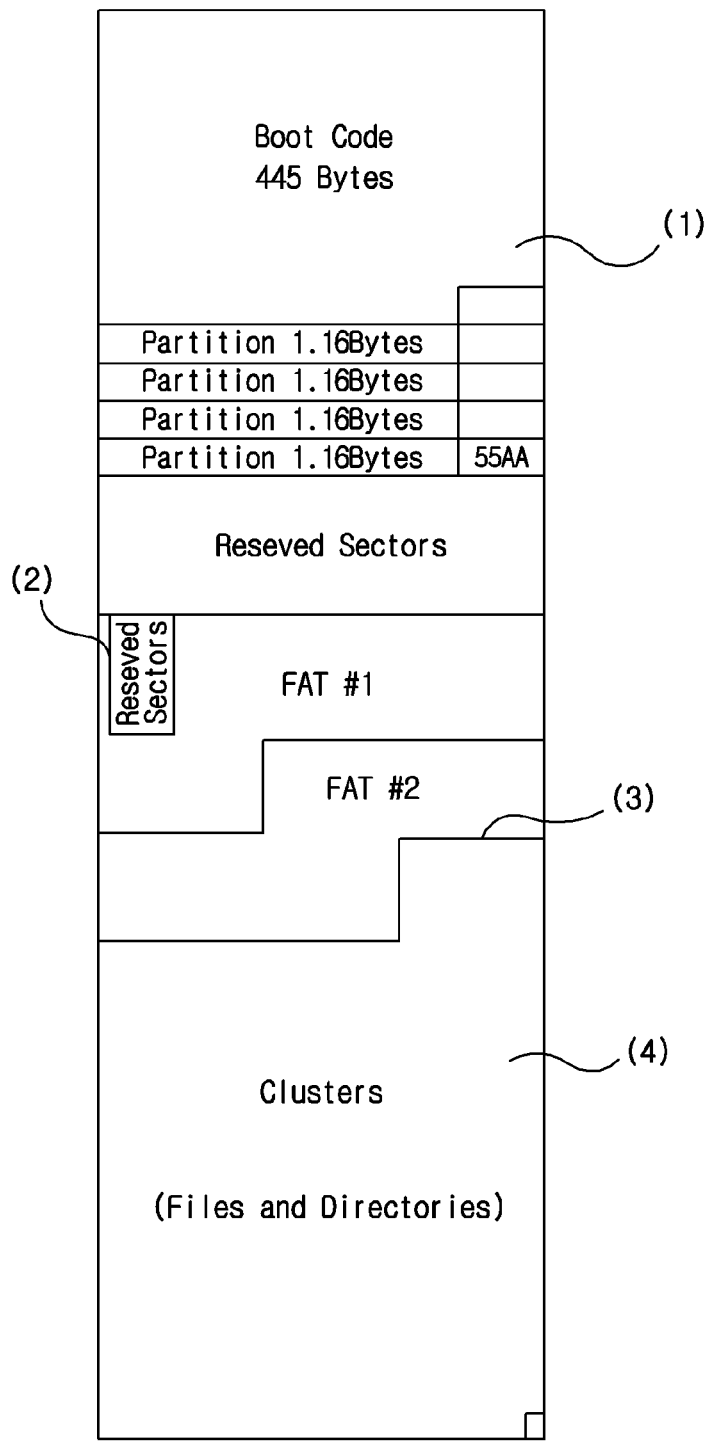
FIG. 2 is an example illustrating a structure of parameter converted into data of a file format according to an embodiment of the present disclosure.

FIG. 2 is an example illustrating a structure of parameter converted into data of a file format according to an embodiment of the present disclosure. Referring to FIG. 2, the parameter is converted into data of a file format having a structure of partition information such as address in section (1), detailed information in sections (2) and (3), and parameter information in section (4).

Further, the controller 20 stores converted data of a file format in a storage address corresponding to an inherent ID address of an inverter so that parameter of each inverter is individually controlled, or sets inverter in a group unit so that parameter of each inverter is stored and managed in a group unit. Further, the controller 20 may control to store parameter of an inverter in an user terminal or an external storage device other than the storage address.

Meanwhile, in the case of a write condition of parameter, the controller 20 detects a storage address corresponding to an inherent ID number of connected inverter, and transfers parameter stored in the detected storage address to at least one of inverter, user terminal and external storage device.

Figure 3:
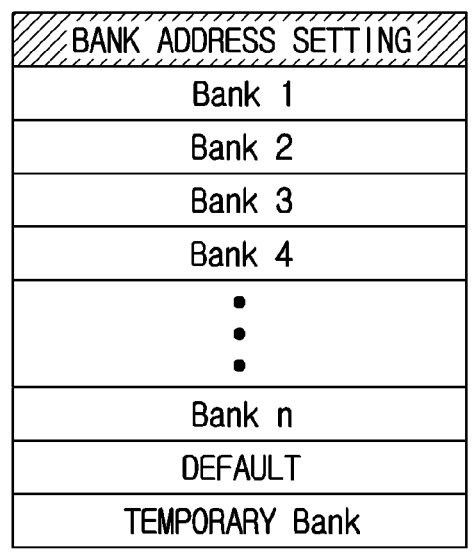
FIG. 3 is a view illustrating a format to store data in an internal storage unit of an apparatus for communicating parameter of an inverter according to an embodiment of the present disclosure.

FIG. 3 is a view illustrating a format to store data in an internal storage unit of an apparatus for communicating parameter of an inverter according to an embodiment of the present disclosure. A storage unit 30 stores relevant data in a plurality of storage addresses according to plural inverters as illustrated in FIG. 3. Here, the relevant data means each parameter stored in the inverter.

Such a storage unit 30 includes an internal storage unit 32 such as a flash memory and an external storage unit 34 such as a SD (Secure Digital) card.

The internal storage unit 32 manages a flash memory having a structure illustrated in FIG. 3, which can support an erase function that is a feature of flash memory in a bank unit, thereby increasing speed and stability. Further, the internal storage unit 32 stores a default value so that an initial value is stored when an error of flash memory is recovered.

The external storage unit 34 is inserted into the apparatus 1 for communicating parameter of an inverter to be used when a backup of parameter is made or data are transferred to a user terminal.

The communication unit 40 communicates with the inverter to transmit or receive parameter stored in the inverter.

Such communication unit 40 includes a USB port 42 that communicates with the user terminal and a communication port 44 that communicate with an external storage unit 34, and the USB and communication ports 42 and 44 receive power together with parameter of the inverter.

As such, a free mobility is guaranteed by making a design that does not need a separate power supply.

The display unit 50 is connected to the controller 20, which is a means to display state information and operation information of the apparatus 1 for communicating parameter of an inverter according to a display control signal from the controller 20. The display unit 50 can be constructed of a liquid crystal display or a light emitting diode, for example.

Hereinafter, an inverter's parameter communication process according to an embodiment of the present disclosure will be described.

Figure 4:
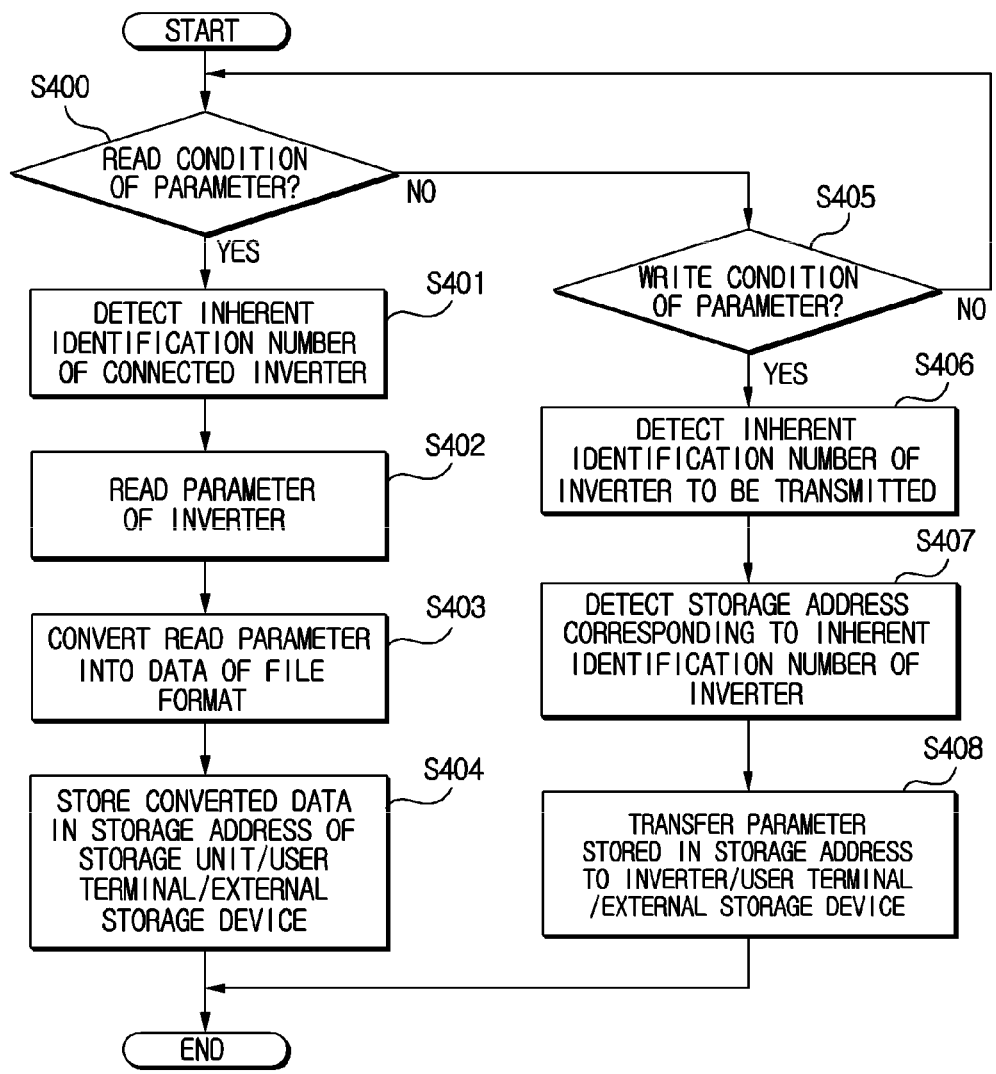
FIG. 4 is a flow chart illustrating a method of communicating parameter of an inverter according to an embodiment of the present disclosure.

FIG. 4 is a flow chart illustrating a method of communicating parameter of an inverter according to an embodiment of the present disclosure. Referring to FIG. 4, it is determined whether a current condition is a read condition among a plurality of setting conditions (S400).

When the current condition is a read condition ('YES' in Step 400), an apparatus 1 for communicating parameter of an inverter detects an inherent ID number of a connected inverter (S401).

Next, the parameter stored in the inverter is read (S402), and the read parameter is converted into data of a file format (S403).

Here, converting the parameter into data of a file format means to store or organize the parameter to be easily found or connected using a user terminal such as a personal computer or an external storage device.

Further, the converted data is stored in a storage address corresponding to an inherent ID number of an inverter stored in the storage unit 30, an external storage device or a user terminal (S404).

Meanwhile, when the current condition is a write condition ('YES' in Step 405), the inverter's parameter communication apparatus 1 detects an inherent ID number of an inverter to be transmitted (S406) and a storage address corresponding to an inverter's inherent ID number (S407).

Next, the parameter stored in the detected storage address is transferred to an inverter, a user terminal or an external storage device (S408).

Additionally, when parameters of an inverter stored in a user terminal or an external storage device are to be set in an inverter or other device, a microcomputer of the user terminal or external storage device performs the same operation as a control unit of the apparatus for communicating parameter of an inverter so that the parameter can be set in an inverter or other device.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

What is claimed is:

1. An apparatus comprising:
    a memory configured to store a plurality of inverter parameters corresponding to a plurality of inverters, each inverter controlling a motor using an associated inverter parameter of the plurality of inverter parameters;
    a communication unit configured to transmit an inverter parameter to a first inverter of the plurality of inverters, or receive the inverter parameter from the first inverter; and
    a controller configured to for:
        determine whether an input command signal from an input unit indicates a read condition or write condition of the inverter parameter of the first inverter,
        determine an inherent identification number of the first inverter connected by the communication unit,
        store the inverter parameter received from the first inverter by the communication unit in at least one of the memory, a user terminal, or an external storage device, when the input command signal indicates the read condition, and
        control the communication unit to transmit the inverter parameter of the first inverter stored in the memory to at least one of the first inverter, the user terminal, or the external storage device, when the input command signal indicates the write condition.

2. The apparatus of claim 1, wherein the controller is further configured to convert the inverter parameter of the first inverter into data of a predetermined format to store the converted data in a at least one of the memory, the user terminal, or the external storage device, when the input command signal indicates the read condition.

3. The apparatus of claim 2, wherein
the memory includes a plurality of storage addresses and each of the inverter parameters is respectively stored in each of the storage addresses.

4. The apparatus of claim 2, wherein the controller comprises a converter configured to convert the inverter parameters into the data of the predetermined format.

5. The apparatus of claim 1, wherein the memory includes a flash memory.

6. The apparatus of claim 1, wherein
the communication unit includes a Universal Serial Bus (USB) port.

7. The apparatus of claim 1, further comprising:
a display unit configured to display state information and operation information.

8. A method comprising:
determining whether an input command signal from an input unit indicates a read condition or write condition of an inverter parameter;
determining an inherent identification number of an inverter connected by a communication unit, the inverter controlling a motor using the inverter parameter; and
storing the inverter parameter received from the inverter in at least one of memory, a user terminal, or an external storage device, when the input command signal indicates the read condition; and
transmitting the inverter parameter stored in the memory to at least one of the inverter, the user terminal, or the external storage device, when the input command signal indicates the write condition.

9. The method of claim 8, further comprising:
converting the inverter parameter into data of a predetermined format; and
storing the converted data in at least one of the inverter, the user terminal, or the external storage device, when the input command signal indicates the read condition.

10. The method of claim 8, wherein the memory includes a plurality of storage addresses and each of a plurality of inverter parameters is stored in each of the storage addresses.

* * * * *